UNITED STATES PATENT OFFICE.

JOHN C. MacLACHLAN, OF ST. PAUL, MINNESOTA, ASSIGNOR TO STANDARD FOOD PRODUCTS COMPANY, OF ST. PAUL, MINNESOTA, A CORPORATION OF DELAWARE.

POWDERED MEAT PRODUCT.

1,398,464.  Specification of Letters Patent.  Patented Nov. 29, 1921.

No Drawing.  Application filed October 4, 1919. Serial No. 328,494.

*To all whom it may concern:*

Be it known that I, JOHN C. MACLACHLAN, a citizen of the United States, residing at St. Paul, in the county of Ramsey and State of Minnesota, have invented certain new and useful Improvements in Powdered Meat Products; and I do hereby declare the following to be a full, clear, and exact description of the invention, such as will enable others skilled in the art to which it appertains to make and use the same.

My invention has for its object to provide a dry powdered meat product which will contain all of the fiber and extractives or juices, and in fact, all of the nutritive elements of the original meat, and which, moreover, will have certain novel and highly desirable features hereinafter noted.

Meat fiber, even when in powdered form, has a more or less rough or gritty feeling in the mouth which is especially objectionable when for the use of invalids or convalescents. Inasmuch as there is a great demand for such powdered meat for use in hospitals, and the like, it is highly important that this rough or gritty condition of fiber be removed without in any way destroying the flavor of the powdered meat or the nutritive qualities thereof.

Partial predigestion, by the use of hydrochloric acid, for example, will remove the rough or gritty condition of the powdered fiber, but it will destroy or disadvantageously change the flavor of the extractives or juices. Hitherto, therefore, manufacturers of powdered meat have been up against the alternative of allowing the powdered fiber to remain in the rough or gritty form or to destroy or damage the flavor of the powder by a partial digestion of all of the ingredients, including the extractives as well as the fiber.

My improved process involves, as a distinctive feature, a temporary separation of the fiber and extractives, a partial predigestion of the separated fiber, and then a re-commingling of the partially digested fiber with the extractives. This accomplishes the desired result above stated without any of the accompanying disadvantages or undesirable features, towit, the rough or gritty nature of the fiber is removed while all of the original flavor of the juices or extractives is maintained.

The process, as carried out in practice, has been as follows:

The lean meat, free from bone and fat, is by suitable means, such as chopping knives, used in making sausage, cut preferably to the condition of a finely chopped sausage. It is a certain fact that these knives will cut the meat fiber finer than they will cut the gristle or tendons, due to the fact that the gristle and tendons will slip under the knives, and this fact is also taken advantage of for the removal of the latter.

To the meat thus finely cut is added a little cold water, so as to make a thick sludge, and then this sludge is rubbed through a sieve, say, for example, a sieve of about twenty mesh, and under this rubbing action, all of the fiber can be rubbed through the sieve while the coarser or finely cut particles or gristle and tendons will not rub through, but will remain on top of the sieve, so that they may be permanently separated from the fiber. This rubbing action further breaks up and separates the fiber.

The next step consists in temporarily separating the fiber from the extractives or juices, and this may be accomplished by placing the same in a fine sieve, say about forty mesh, which will allow the juices and extractives to run through but will hold back the fiber.

The separated fiber is then partially predigested by the well known use of hydrochloric acid, and then the hydro-chloric acid is neutralized by the use of soda or other neutralizing agent.

Next the juices and the partially predigested fiber are recommingled and thoroughly stirred together, again forming a thick sludge which may also be described as a semi-fluid which, nevertheless, will flow quite freely, although more slowly than water.

The next highly important step in the process consists in reducing this sludge to a dry powdered form, in which form the dry powder will contain all of the juice or extractives, as well as the original fiber of the meat with all of the water removed therefrom. Here it will be stated that this powder will contain only about 4½ per cent. of water, which, of course, leaves the powder in very dry form. This last step just noted may be accomplished in different ways, but by far the best results are obtained by beating the sludge into a fine spray in the presence of a hot drying medium, preferably hot air. In practice, for this purpose, I employ a combined spraying and beating head, such as that disclosed in my pending application S. N. 287,233, filed of date, April 3, 1919, and allowed of date, September 9th, 1919, entitled "Apparatus for producing powdered meat products, and the like," and in the use of which spraying head, the sludge may be fed to the combined spraying and beating head by any suitable means.

The dry powdered meat product thus obtained, as already indicated, contains all of the original fiber and extractives, towit, all of the nutritive elements of the original meat, and in which the fiber will be freed from all natural gritty or rough nature, and all of the natural flavors of the original meat will be preserved. Moreover, this meat powder, because of the partial predigestion of the fiber, will be more easily digestible, and hence, much better adapted for use by invalids and convalescents, and for that matter, by users generally, than the form of powdered meat heretofore produced.

What I claim is:

1. A meat product containing the original fiber and extractives, the fiber being finely divided and partially predigested, but the extractives therein being in natural condition and having their natural flavor.

2. A dry powdered meat product containing the original fiber and extractives, the fiber thereof being partially predigested but the extractives therein being in natural condition and having their natural flavor.

3. The process of producing a meat powder containing the original fiber and extractives which consists, first in reducing the meat to finely divided form, temporarily separating the fiber and extractives, then partially predigesting the fiber, then recommingling the partially digested fiber with the extractives, and thereafter reducing the commingled mass to a substantially dry comminuted form.

4. The process of producing a powdered meat containing all of the original fiber and extractives, which consists first in reducing the meat to finely divided form, then temporarily separating the fiber and extractives, then partially predigesting the fiber, then recommingling the partially digested fiber with the extractives, and thereafter spraying the commingled fiber and extractives in the presence of a hot drying medium to reduce the same to dry powdered form.

5. The process of producing powdered meat containing all of the original fiber and extractives, which consists in first reducing the meat to finely divided form, then temporarily separating the fiber and extractives, then partially predigesting the fiber, then recommingling the partially digested fiber with the extractives, and thereafter reducing the commingled mass to a dry powdered form by combined spraying and beating action in the presence of a hot drying medium.

6. The process of producing a meat product containing the original fiber and extractives, which consists, first in reducing the meat to a finely divided form, then temporarily separating the fiber from the extractives, then partially predigesting the fiber by the use of hydro-chloric acid, then neutralizing the free hydro-chloric acid to form a salt, then recommingling the partially digested fiber with the extractives, and thereafter reducing the commingled mass to substantially dry comminuted form.

In testimony whereof I affix my signature.

JOHN C. MacLACHLAN.